INVENTORS.
EUGEN WEBER
VICTOR F. ZAHNER

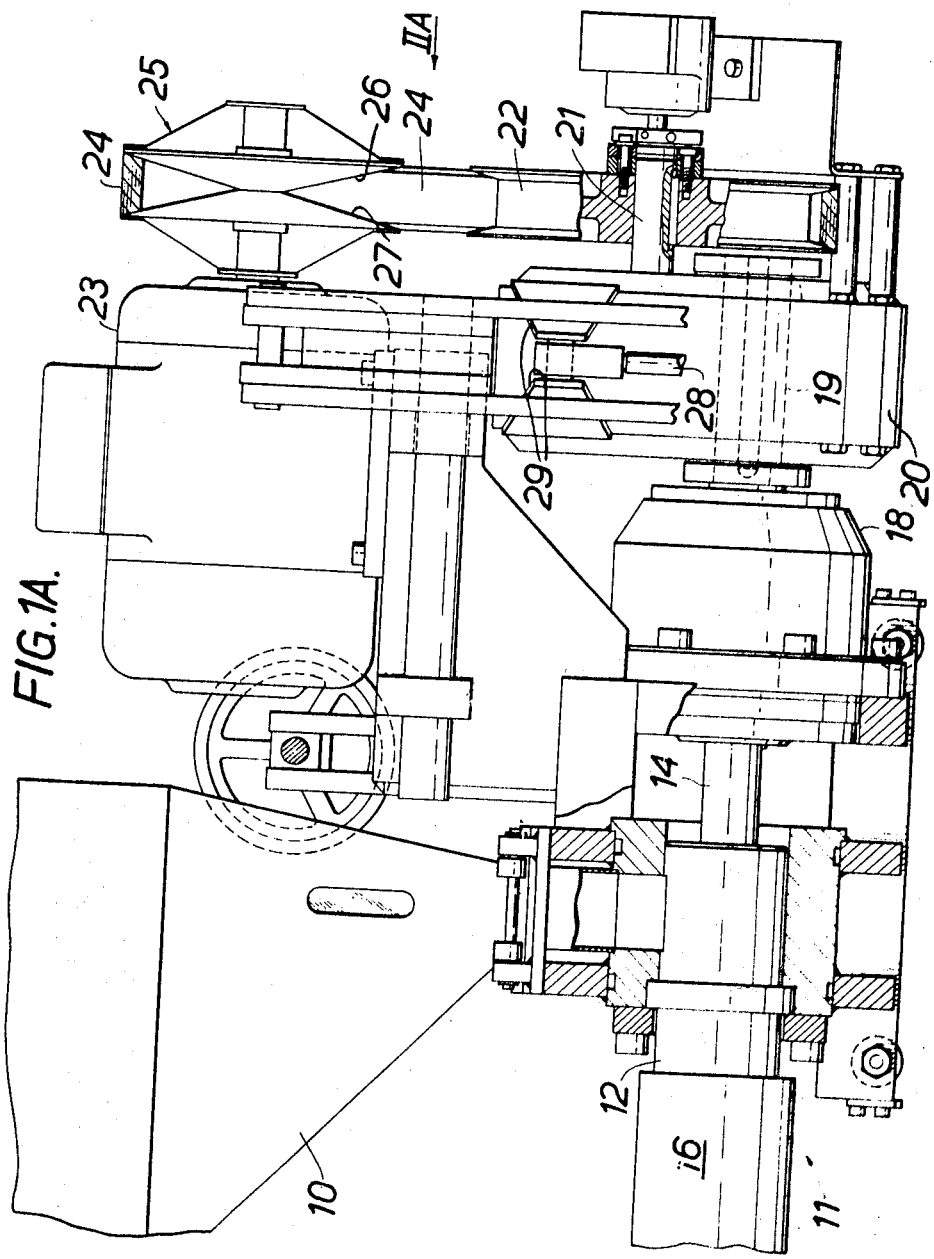

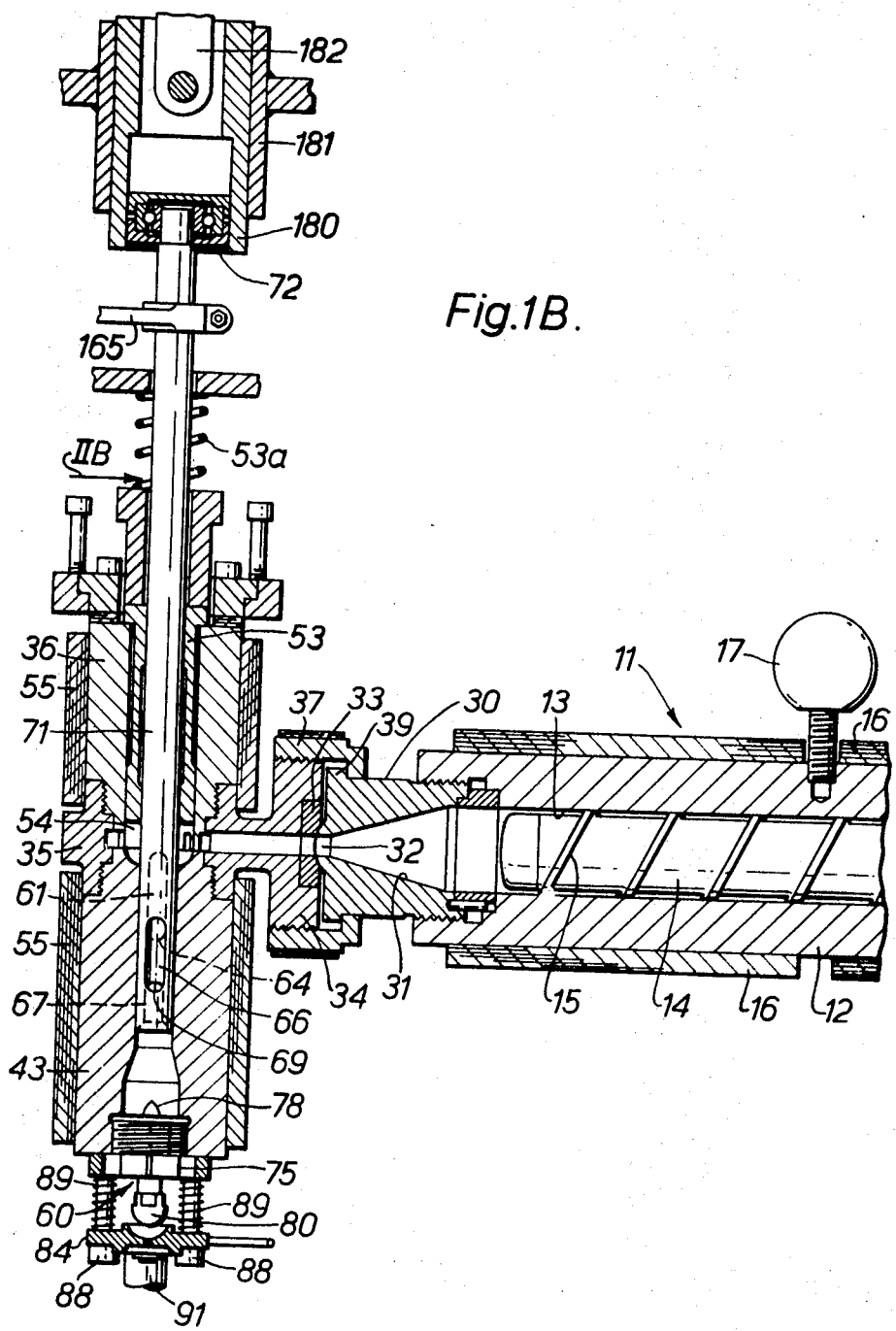

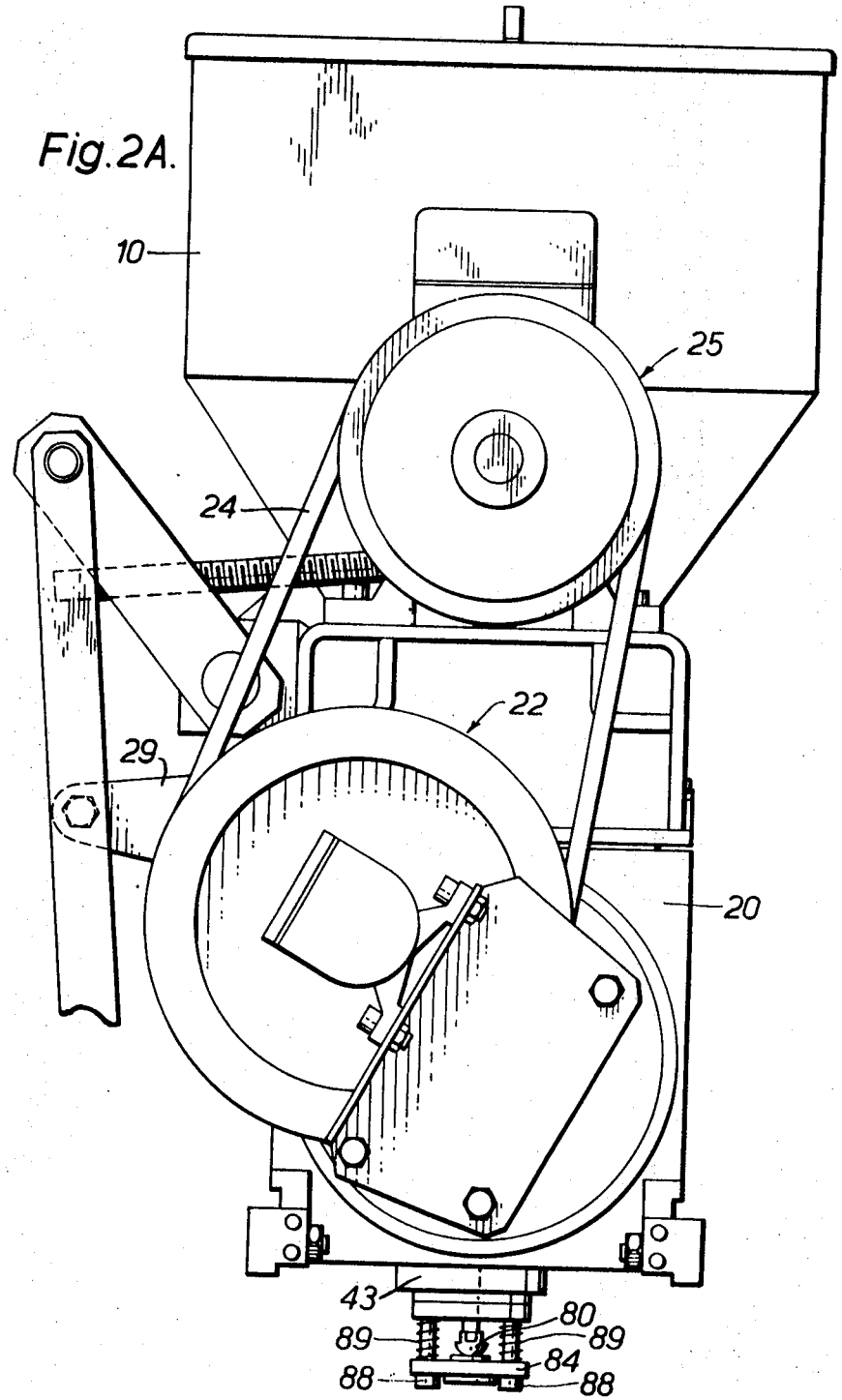

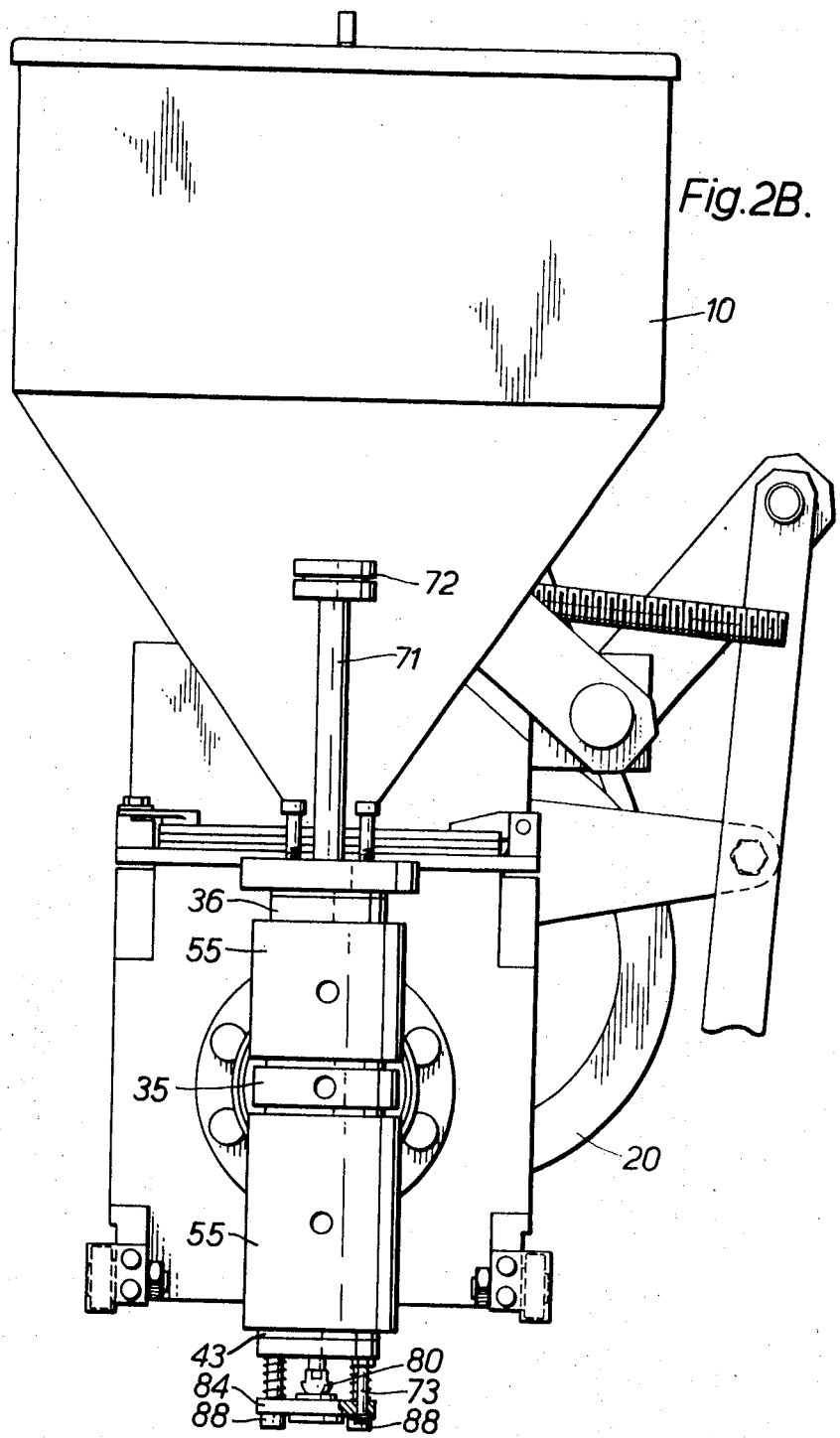

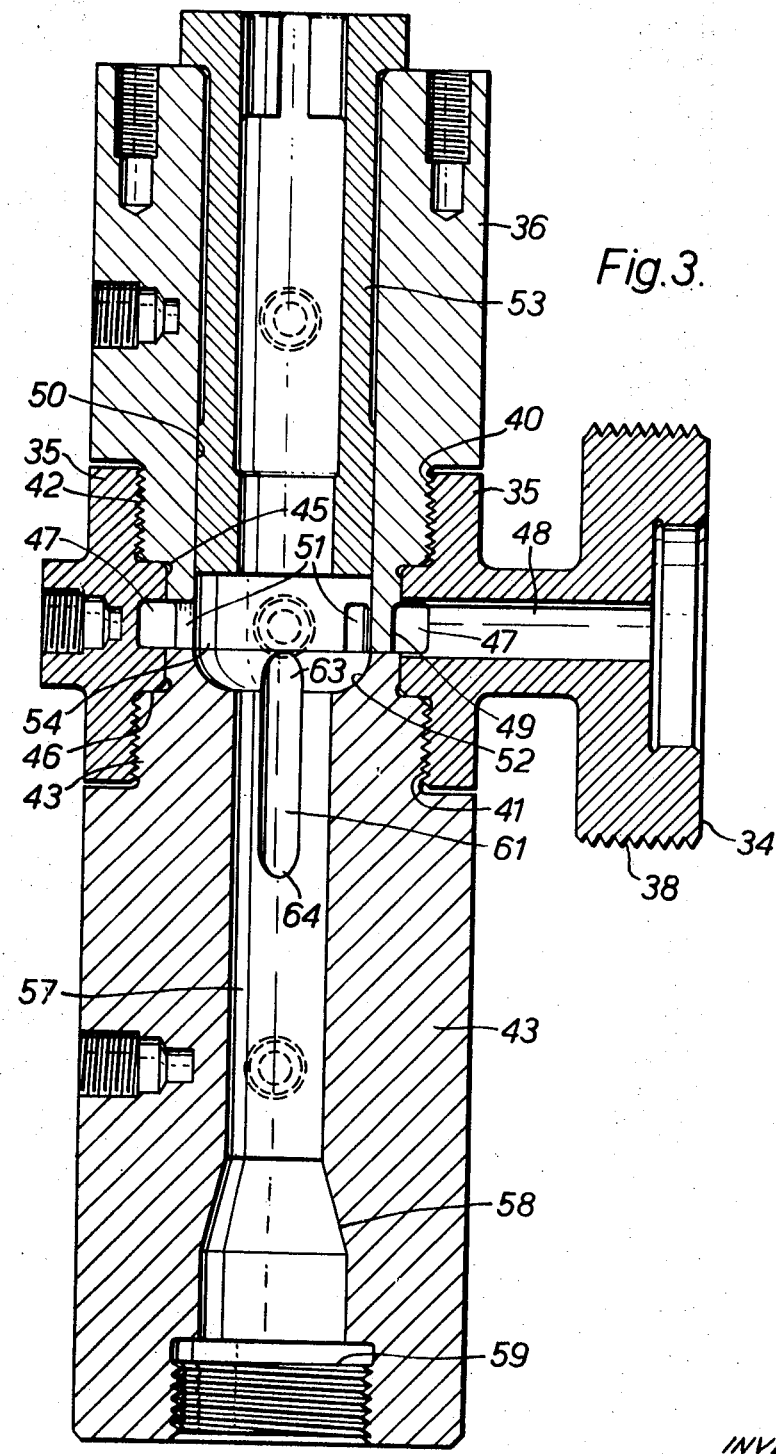

BY Tennyon & Tennyon
ATTORNEYS

Oct. 12, 1971   E. WEBER ET AL   3,611,505
PLASTIC MOULDING MACHINES
Filed Dec. 23, 1969   13 Sheets-Sheet 7
Fig.6.   Fig.7.
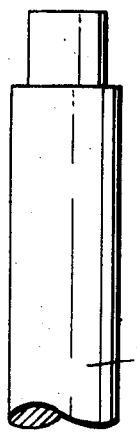
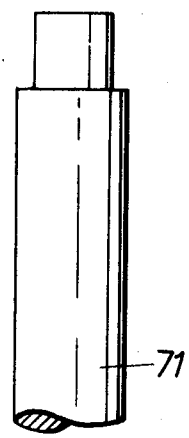
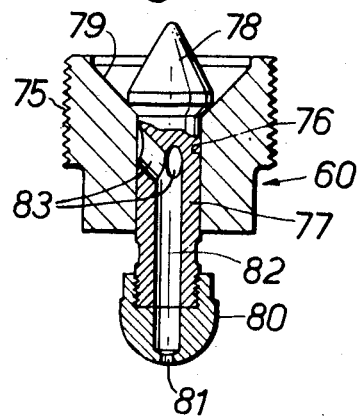
Fig.8.
Fig.9.
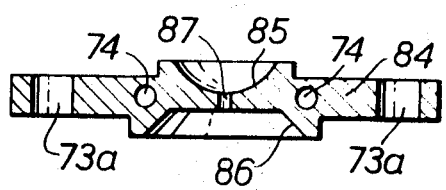
Fig.10.
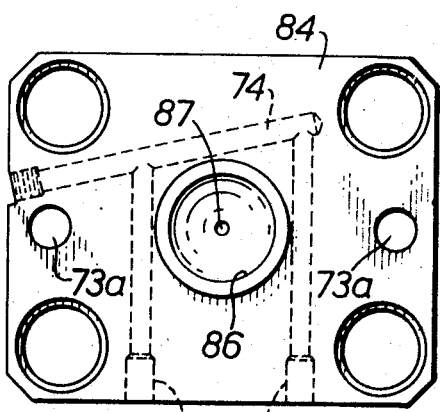
INVENTORS.
EUGEN WEBER
VICTOR F. ZAHNER
BY Kenyon & Kenyon
ATTORNEYS Oct. 12, 1971    E. WEBER ETAL    3,611,505
PLASTIC MOULDING MACHINES
Filed Dec. 23, 1969    13 Sheets-Sheet 8

INVENTORS.
EUGEN WEBER
VICTOR F. ZAHNER

BY Kenyon & Kenyon
ATTORNEYS

INVENTORS.
EUGEN WEBER
VICTOR F. ZAHNER

BY Kenyon & Kenyon
ATTORNEYS

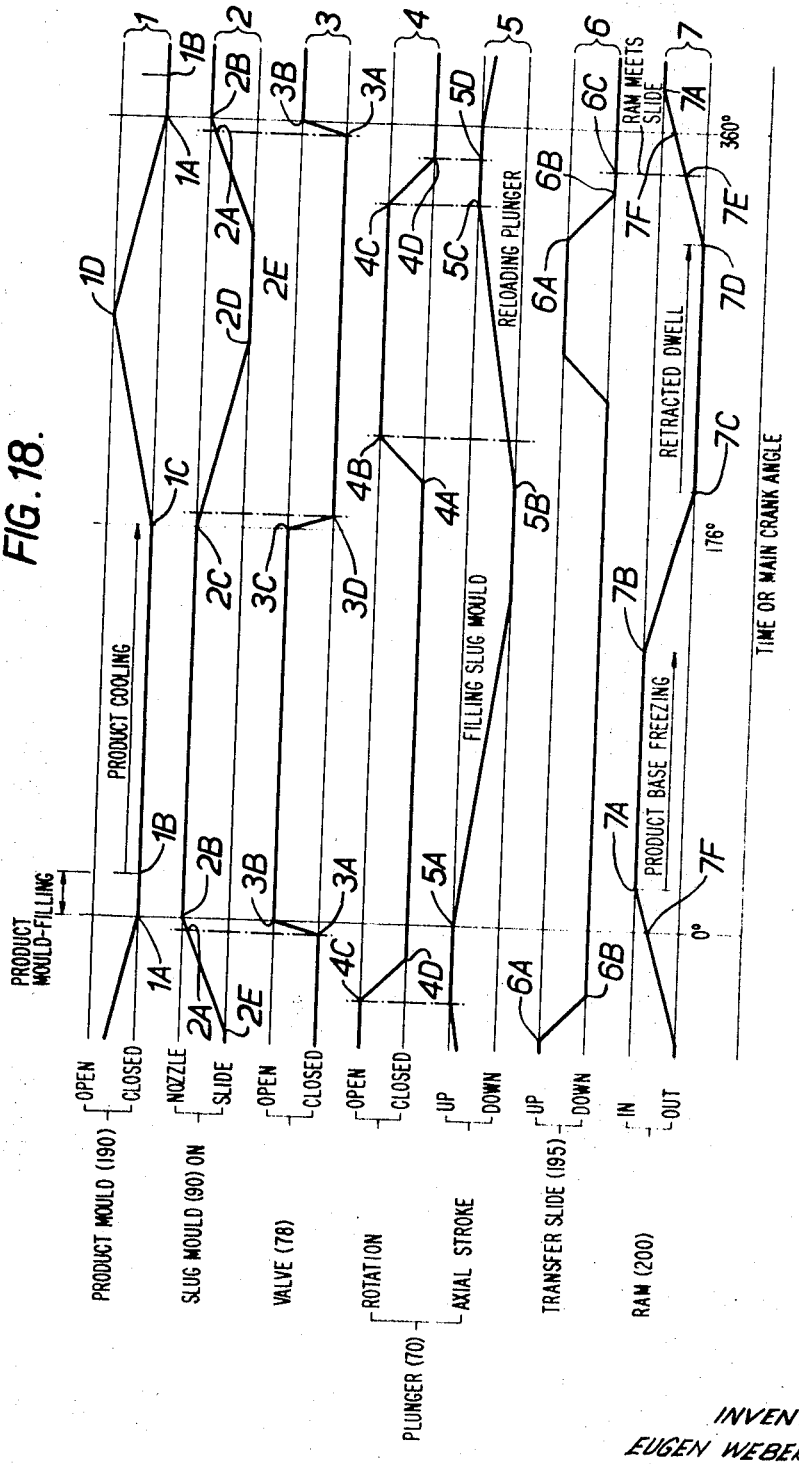

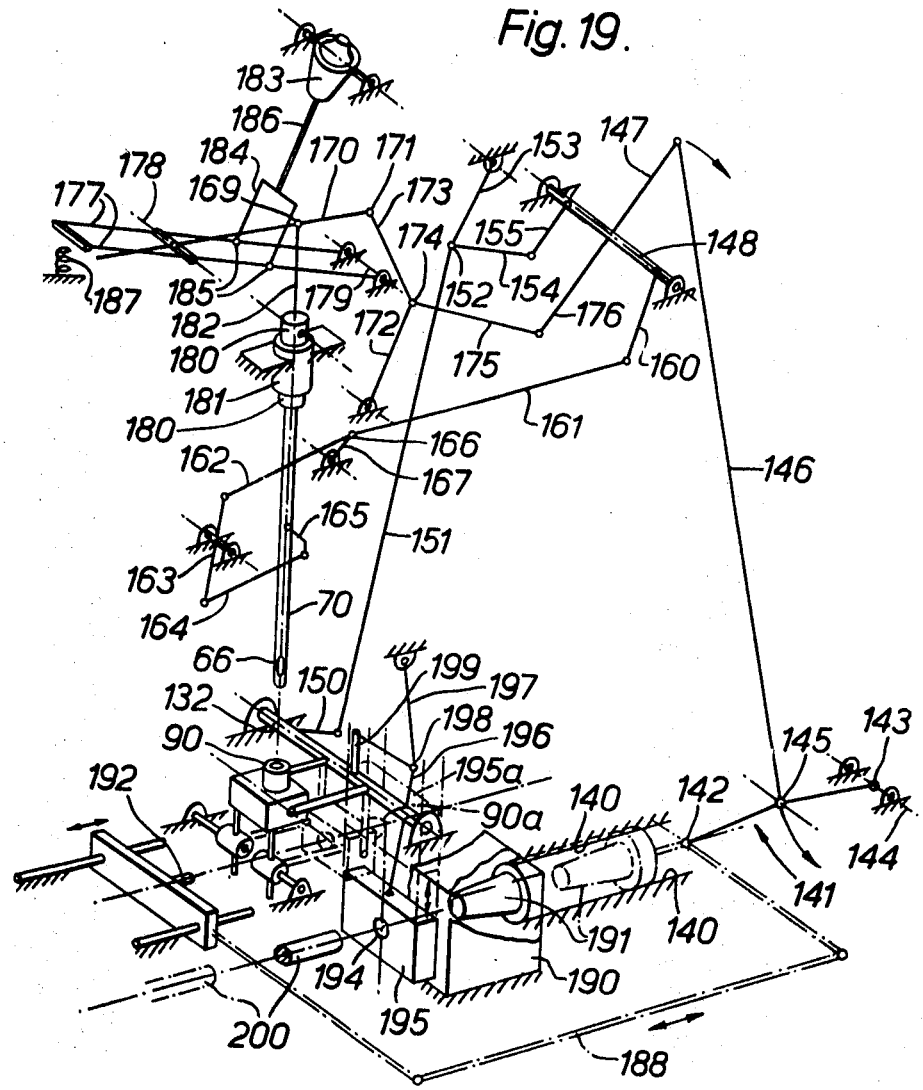

United States Patent Office 3,611,505
Patented Oct. 12, 1971

3,611,505
PLASTIC MOULDING MACHINES
Eugen Weber, Hinwil, Zurich, and Victor F. Zahner, Geneva, Switzerland, assignors to Harry Dudley Wright and Robert Ernest Leclerc, both of Geneva, Switzerland
Filed Dec. 23, 1969, Ser. No. 887,590
Claims priority, application Great Britain, Dec. 27, 1968, 61,523/68
Int. Cl. B29f 1/04, 1/06
U.S. Cl. 18—30 AP                    14 Claims

ABSTRACT OF THE DISCLOSURE

A metering device for a plastic moulding machine having a plasticiser for supplying plasticised material and a product mould for forming the plasticised material into a finished product comprises an accumulator chamber open to the plasticiser and having an outlet passage in which a feed plunger is both reciprocable on alternate feed and retraction strokes and rotatable between angular limit positions. The feed plunger has an axial metering cavity in its leading end which communicates with the accumulator chamber by way of a port in the side of the feed plunger which can register, in one limit position of rotation, with a blind channel in the internal wall of the outlet passage. The blind channel is open at one end to the accumulator chamber and terminates at the other end short of the discharge end of the outlet passage but beyond the limit of lengthwise travel of the plunger port. The feed plunger actuating mechanisms are preferably driven from the mould opening and closing mechanism through a toggle linkage.

---

This invention relates to plastic moulding machines, and has for an object to provide a machine which is capable of working a wide range of thermoelastic materials to produce a moulded product having a high degree of consistency and repeatability.

A problem which sometimes arises in machines which mould a product under pressure generated by a ram moving at relatively high speed during the moulding stroke is the exclusion of air bubbles. If air is trapped in the mass of plastic material while it is being forced into the product mould, the air is compressed adiabatically and its temperature rises very rapidly to a very high value which decomposes the surrounding material and can actually damage the surface of the metal of the ram or mould.

Another difficulty which is sometimes encountered in moulding machines is the formation of stagnant pockets in the flow path of the material from the plasticiser to the product mould which can cause decomposition of the material.

It is an object of the present invention to overcome these difficulties by providing an accumulator to which plasticised moulding material can be continuously fed and stored under pressure and from which the material can be intermittently discharged through an outlet passage by means of a feed plunger which is a snug fit in the outlet passage for both reciprocation and rotation, and which may pass through the accumulator.

Reciprocation of the plunger provides the alternate feed and retraction strokes, whilst rotation thereof between alternate limit positions governs alternate opening and closing of one or more ports which provide access for plasticised material in the accumulator chamber to a feed cavity in front of the plunger.

More concisely stated, the invention provides an accumulator having a chamber open to a source of plasticised material; means for maintaining a substantially constant pressure in the plasticised material; an outlet passage leading from the chamber, and a feed plunger in the outlet passage and having an axial feed cavity opening through its outer or discharge end and communicating at its inner or inlet end with the chamber through a port, the plunger being both reciprocable to feed a charge from the discharge end of the outlet passage and rotatable to cut off the port at least over the final part of each feed stroke.

Preferably, the outlet passage has a blind channel formed in its wall extending from the accumulator chamber to a point short of the discharge end of the outlet passage but beyond the limit of travel of the port on a feed stroke of the plunger.

Advantageously, a plurality of blind channels are symmetrically disposed around the wall of the passage and an equal number of ports are similarly disposed around the periphery of the feed plunger such that, in one limit position of rotation of the plunger the ports register with respective channels and in the other limit position of rotation of the plunger the ports are out of register with the channels. Thus, in the said one limit position of rotation of the feed plunger, each port is always in communication with the accumulator, either directly (if the plunger is retracted far enough) or via the registering channel.

The feed cavity is conveniently formed by a counterbore in the plunger and its discharge end preferably registers with a valve which normally closes the discharge end of the accumulator outlet passage. This valve may be biased to the closed position by the pressure of the plasticised moulding material in the accumulator, but may be adapted to be opened at the start of the feed stroke of the feed plunger by a slug mould or container which is cyclically displaceable and adapted to be filled with moulding material to form a slug which is subsequently rammed into a product mould.

The feed plunger is adapted to perform the following sequence of events, starting from its fully retracted position and in its one limit position of rotation in which the feed cavity ports register with the blind channels;

(1) rotation to the other limit position in which the feed cavity ports are out of register with the blind channels;
(2) feed stroke through the accumulator outlet passage;
(3) rotation to initial limit position where the feed cavity ports register with the blind channels;
(4) retraction stroke.

In a machine incorporating the present invention, the motions of the feed plunger and the slug mould or container are suitably synchronised with the displacements of the ram which forces each slug in turn into the product mould. The product mould may also be reciprocable in timed relation to the ram, a convenient mechanism for this purpose being that described in our co-pending U.S. patent application No. 818,518.

Preferably, the accumulator has one wall of its chamber displaceable against a load such as a spring. This wall can be in the form of a diaphragm, but is preferably a sleeve closely surrounding the shank of the feed plunger and acting as a guide or steady therefor, and itself slidable in a coaxial bore in the structure of the accumulator.

The accumulator may be attached to the discharge end of a conventional type of screw plasticiser which operates to soften or plasticise the input moulding powder or granules in known manner.

The axis of the feed plunger is preferably perpendicular to that of the plasticiser screw and arranged vertically.

The valve which normally closes the discharge end of the accumulator outlet passage preferably has a conical head carried on a hollow stem, the head being accommodated in a valve chamber and seating on a coaxially coned surface thereof. Below the valve head, the valve stem is ported to provide access to the bore of the stem from the valve chamber when the valve head is lifted off its seat.

A moulding machine according to the present invention may also incorporate a transfer slide adapted to receive the slug formed in the slug mould or container and transfer it into alignment with the entry to the product mould cavity. The motions of this transfer slide are synchronised with the ram and with the slug mould displacement mechanism, and both are conveniently driven from the mechanism for reciprocating the ram.

A practical embodiment of the present invention will now be described, by way of example only, with reference to the accompanying drawing in which:

FIGS. 1A and 1B together are a part-sectional elevation of the plasticiser head;

FIGS. 2A and 2B are views, respectively, on the arrow IIA of FIG. 1A and the arrow IIB of FIG. 1B;

FIG. 3 is a sectional elevation of the accumulator (omitting the feed plunger) at the discharge end of the plasticiser screw in FIG. 1B;

FIGS. 6 and 7 are views seen at right angles to each other of the feed plunger for the sub-assembly of FIG. 3;

FIG. 8 is a sectional elevation on a larger scale of the discharge valve of FIG. 1B;

FIG. 9 is an enlarged sectional view of the cut-off plate of FIG. 1B;

FIG. 10 is a plan view of FIG. 9;

FIG. 18 is a chart showing the correlation of various components of the machine, and FIG. 19 is a schematic diagram of part of the operating mechanism.

Figure 4:
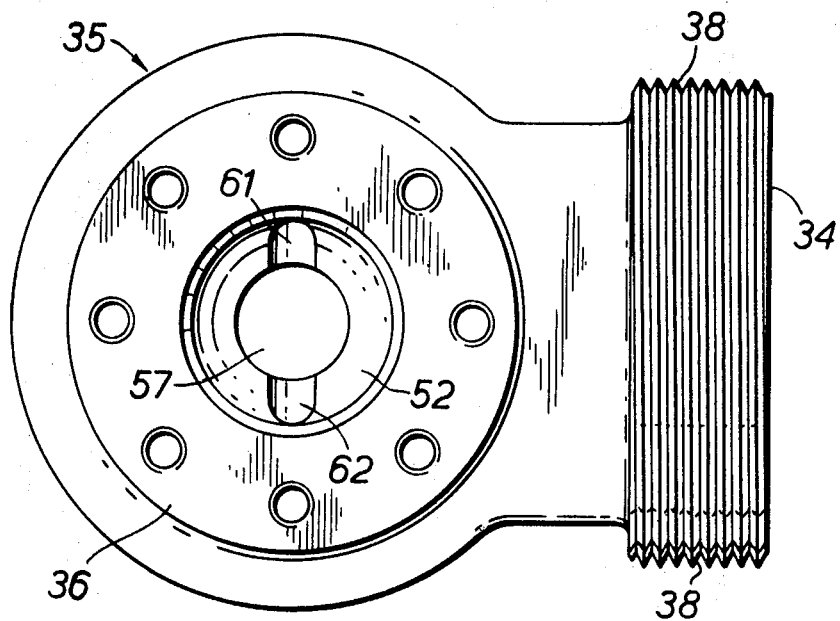
FIG. 4 is a plan view of FIG. 3.

Referring first to FIGS. 1A-3 of the drawings powdered or granular moulding material is charged into the hopper 10 of a generally conventional screw plasticiser unit indicated generally at 11. As shown in FIG. 1B, this unit comprises a cylindrical sleeve or barrel 12 having a smooth axial bore 13 in which a conventional screw 14 having lands 15 is rotatable.

The radial width of the annular channel or pass between the core of the screw and the internal wall of the bore 13 progressively decreases. The ratio of length to diameter of the barrel 12 over which the screw 14 is operative is usually of the order of 20:1, and the compression ratio of the screw is of the order of 2.5:1.

The barrel 12 is jacketed by conventional electric heater elements 16 which serve to supply the necessary consistency. The temperature at selected points along the screw feed plasticiser 11 is measured by thermometers such as that shown at 17 (FIG. 1B), which may also serve as the detectors for an automatic temperature control system.

The screw 14 is driven through a coupling 18 from the output shaft 19 of a gearbox 20 whose input shaft 21 has keyed thereon a drive pulley 22 engaged by a driving belt 24 which also wraps round a variable diameter pulley 25 on the shaft of a constant speed motor 23. The pulley 25 has oppositely coned flanges 26, 27 which are spring loaded into their position of minimum axial separation in which the belt rides up to the outer diameter of the coned flanges as shown in FIG. 1A to give higher speed of rotation of the pulley 22. By increasing the tension in the belt 24, the flanges 26, 27 can be forced apart to allow the belt to move closer to the axis of the shaft of the pulley 25 so as to decrease the speed of the pulley 22.

The gearbox 20 is of a known type which is adapted to be pivotally mounted coaxially with its output shaft 19. Its input shaft 21 is not coaxial with the output shaft, so that pivotal movement of the gearbox results in lateral bodily displacement of the input shaft 21. Thus, variations in load on the plasticiser screw 14 result in variations of torque reaction on the casing of the gearbox 20 which in turn produce angular deflections on the gearbox 20 about the axis of the output shaft 19. Increasing torque reaction is resisted by a constant pressure air cylinder motor (not shown) attached to a rod 28 which is pivotally connected to a bifurcated torque reaction bracket 29 on the gearbox casing 20, so that the system is self-compensating to give relatively constant delivery pressure of plasticised material at the discharge end of the screw 14.

The delivery end of the plasticiser screw barrel 12 is threaded to carry an adaptor section 30 which has a conical bore 31 terminating in a part-spherical nipple or nose 32. This nipple is held tight against a correspondingly recessed insert 33 in a threaded flange 34 which is integral with the central feed section 35 of an upper accumulator body 36 (see particularly FIGS. 1B and 3), the adaptor section 30 and the flange 34 being securely clamped together by means of a ring nut 37 engaging the threaded circumference 38 of the flange 34 and held captive on the adaptor 30 by a flange 39 thereon.

Figure 5:
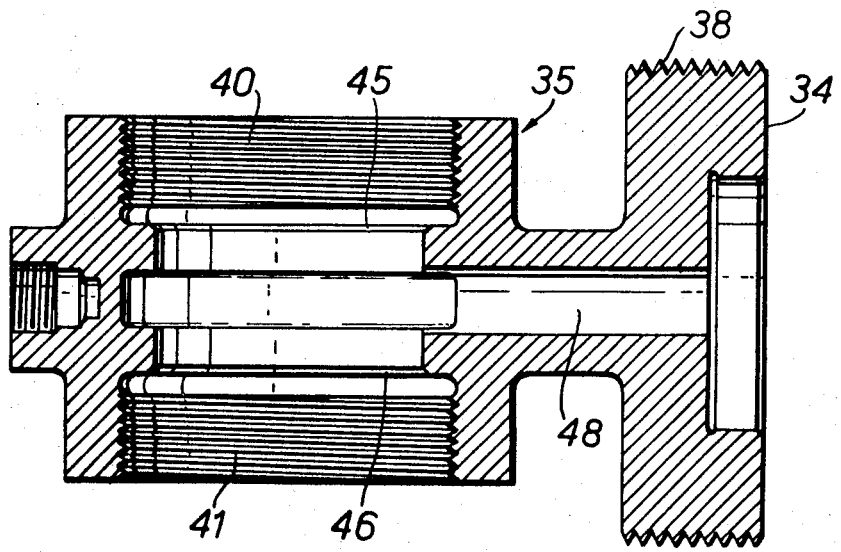
FIG. 5 is a sectional elevation of part of FIG. 3.

The central feed section 35 of the accumulator constitutes also an internally threaded junction ring more clearly seen in FIGS. 4 and 5. This ring 35 has coaxially opposed threaded sockets 40, 41, the socket 40 receiving a corresponding threaded spigot 42 on the lower end of the upper accumulator body 36. The opposed socket 41 receives a similar correspondingly threaded spigot 43 on the upper end of a lower accumulator body 44.

Between the sockets 40 and 41 lie a pair of spaced annular shoulders 45, 46 which flank an annular distribution gallery 47. This gallery communicates, by a radial duct 48 which passes axially through the flange 34, with the nipple 32 so that material discharged by the plasticiser feed screw 14 through the adaptor 30 enters the annular gallery 47. The inner wall of the annular gallery is defined by a reduced diameter cylindrical extension 49 of the upper accumulator body 36 which abuts tightly against the opposing end face of the lower accumulator body 43. Both the upper and the lower accumulator bodies 36 and 43 are bored axially to provide a through passage from top to bottom of the accumulator assembly on an axis perpendicular to that of the feed screw 14. The bore 50 in the upper accumulator body 36 is of constant diameter throughout. Within the reduced diameter extension 49, the bore 50 communicates with the annular gallery 47 through radial ports 51.

The meeting end of the lower accumulator body 43 is formed with a shallow cup-like recess 52 whose maximum diameter is equal to that of the bore 50 and effectively constitutes a partially closed lower end of the latter.

Within the bore 50 is fitted a spring loaded sleeve 53 whose lower end is a sealing fit in the bore 50 for sufficient length to prevent the escape of plasticised material under pressure between the sleeve and the bore. The remainder of the external diameter of the sleeve 53 is relieved in conventional fashion so as to reduce friction when the sleeve slides in the bore. The sleeve 53 is loaded by a spring shown diagrammatically at 53a (FIG. 1B). The lower end of the sleeve 53 lies a short distance above the level of the radial ports 51 and, together with the cup-shaped recess 52 and the shank of the feed plunger (to be described below) which passes through the sleeve and the recess, serves to define an accumulator chamber 54 which, during operation of the machine, will normally be filled with plasticised material. The volume of the resultant annular accumulator chamber 54 is variable by virtue of the ability of the sleeve 53 to slide upwards against spring pressure in order that a substantially constant pressure can be maintained in the chamber 54.

The cup-shaped recess 52 in the lower accumulator body 43 opens centrally into an outlet passage 57 whose lower discharge end is outwardly flared to meet a threaded socket 59 for the reception of a delivery valve unit indicated generally at 60 in FIGS. 1B and 8.

The whole of the active lengths of the upper and lower accumulator bodies 36, 43 are jacketed in conventional manner by electric heaters 55.

In the wall of the outlet passage 57 are formed two symmetrically disposed blind channels 61, 62 whose combined widths is less than half the circumference of the passage 57. Their upper ends 63 (FIG. 3) are permanently open to the accumulator chamber 54, and they are of sufficient length to ensure that their lower blind ends 64 can register with respective ports 66 (FIGS. 1B, 6 and 7) in a feed plunger 70 when the latter is at the limit of its feed stroke. This plunger is a close fit in the outlet passage 57, and its shank portion 71 extends upwards through the accumulator chamber 54 and the bore through the spring-loaded sleeve 53 to terminate in a thrust bearing 72 engageable with an internal shoulder 168 in a sleeve 180 to be described below.

The lower or discharge end of the feed plunger 70 is counterbored to form a cavity 67 with a chamfered mouth 68 to prevent "cavitation" and dead zones in the flow of plastic material, the ports 66 opening into the upper end of this metering or feed cavity 67 and being separated for most of their lengths by a stiffening wall 69.

The delivery valve 60 (FIG. 8) comprises a body part 75 threaded at its upper end to engage the threaded socket 59 at the discharge end of the outlet passage 57. The valve body 75 has a through coaxial conduit 76 to receive as a snug sliding fit a tubular valve stem 77 having a double-coned valve head 78 which seats on part of a conical wall 79 into which the upper end of the conduit 76 opens. The lower end of the stem 77 carries a hemispherical nipple 80 having a reduced diameter discharge orifice 81. Below the head 78, the bore of the tubular stem terminates at its junction with several symmetrically arranged inclined ports 83 which are sealed by the wall of the conduit 76 when the head 78 seats on the conical wall 79 but which are opened to the coned valve chamber when the head is lifted off its seat by pressure on the nipple 80 from below.

Figure 11:
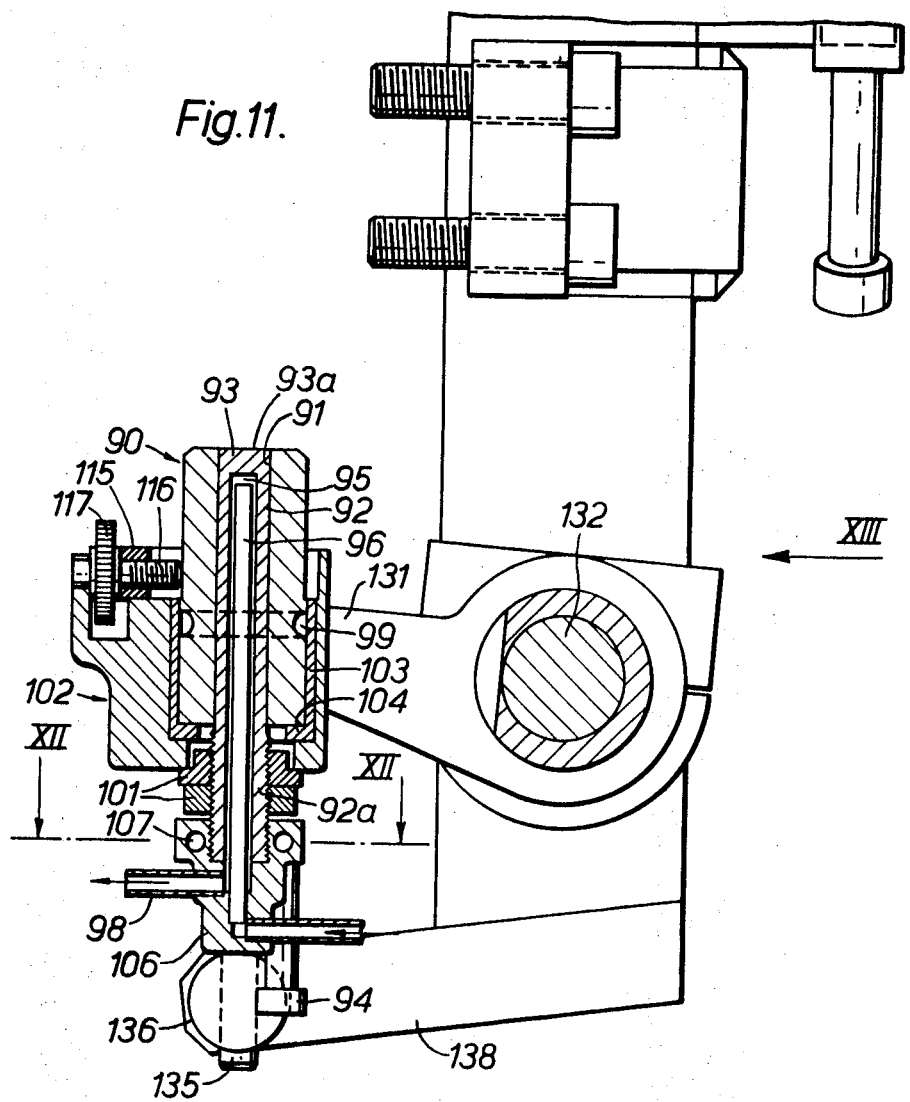
FIG. 11 is a part-sectional elevation of the slug mould on the line XI—XI of FIG. 13.
Figure 12:
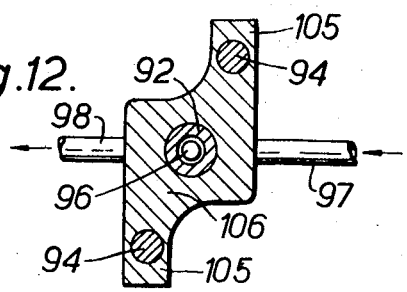
FIG. 12 is a fragmentary section on the line XII—XII of FIG. 11.
Figure 13:
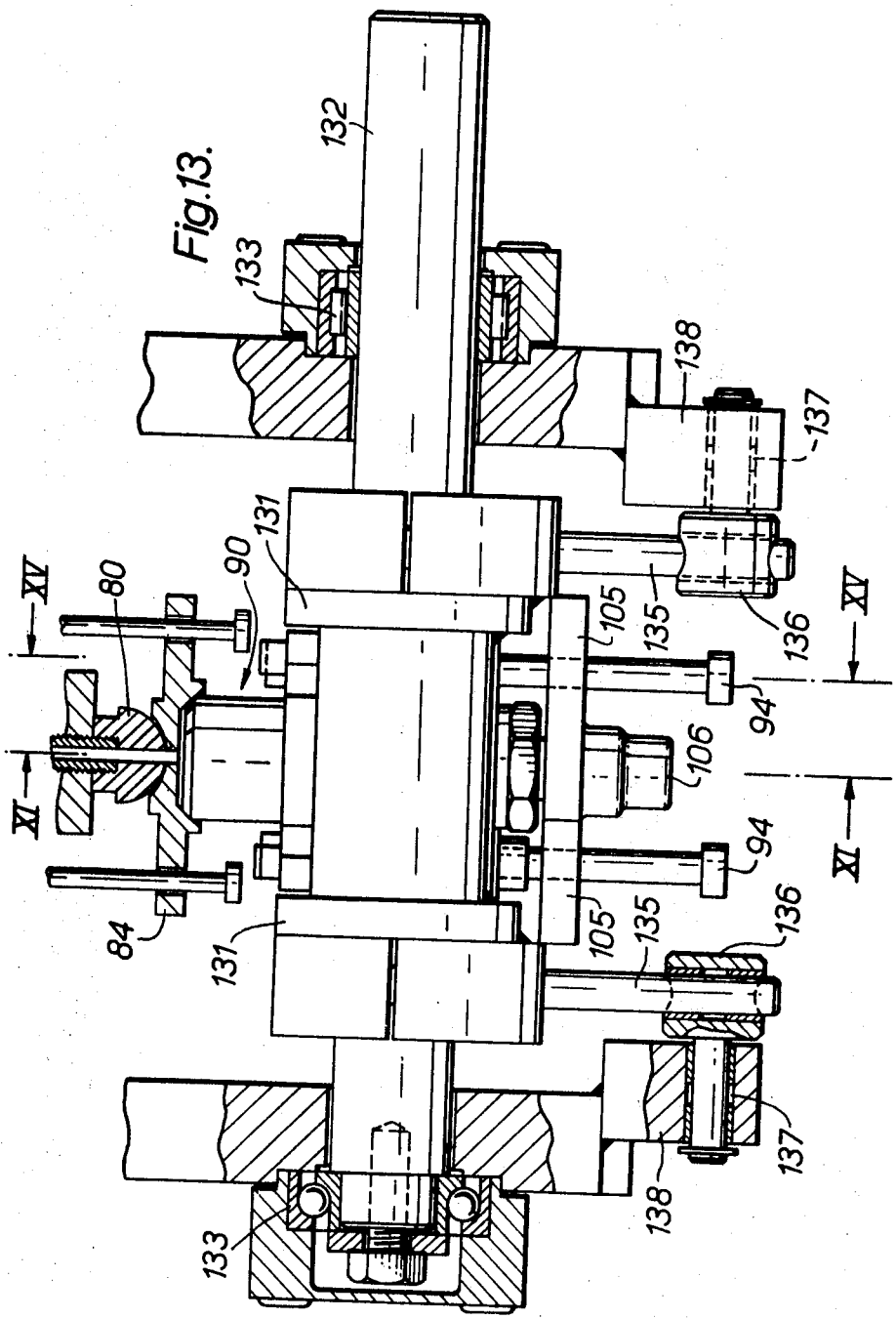
FIG. 13 is a part-sectional elevation on the arrow XIII of FIG. 11.
Figure 14:
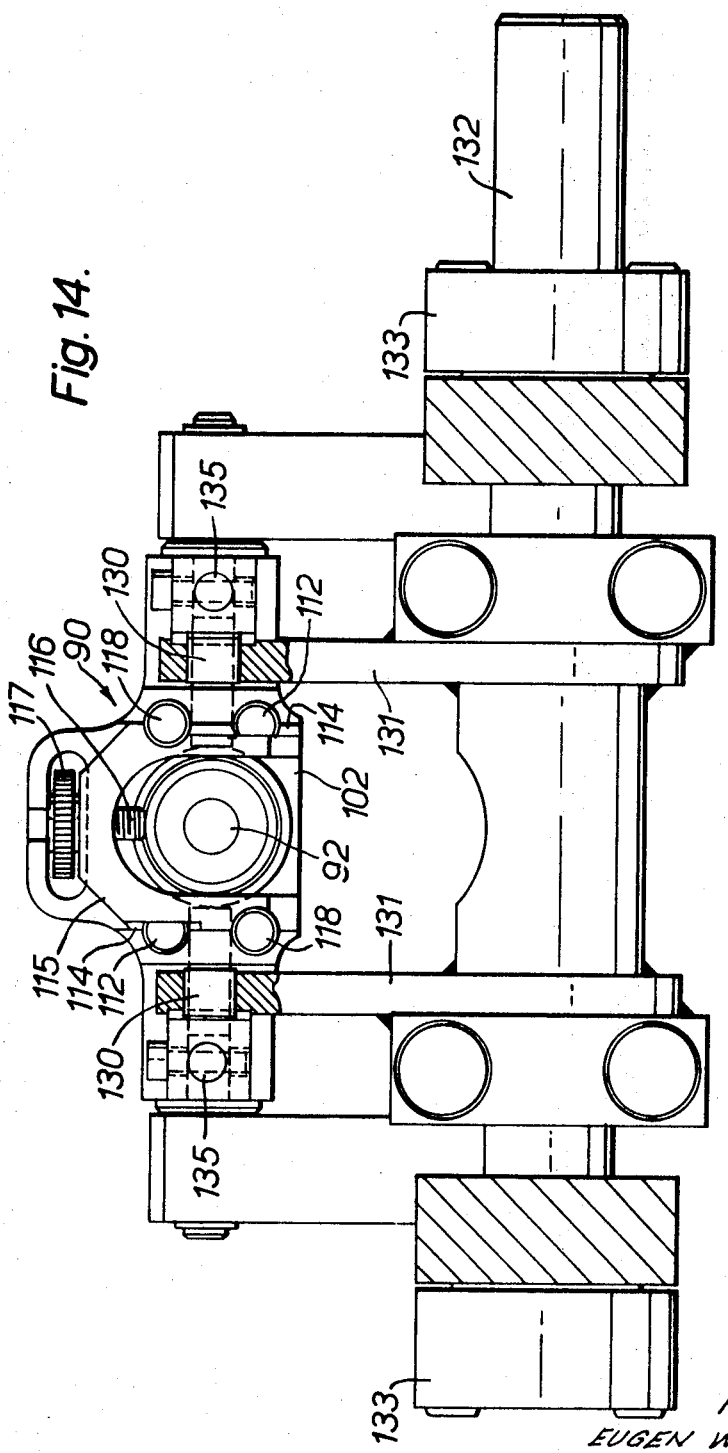
FIG. 14 is a part-sectional plan of the slug mould.
Figure 15:
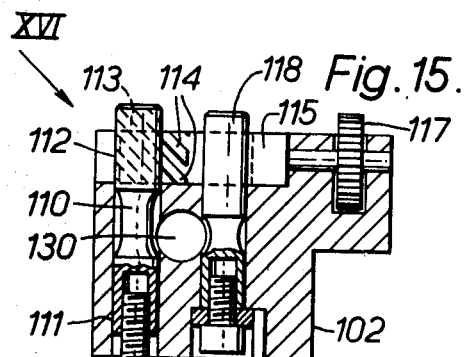
FIG. 15 is a fragmentary section on the line XV—XV of FIG. 13.
Figure 16:
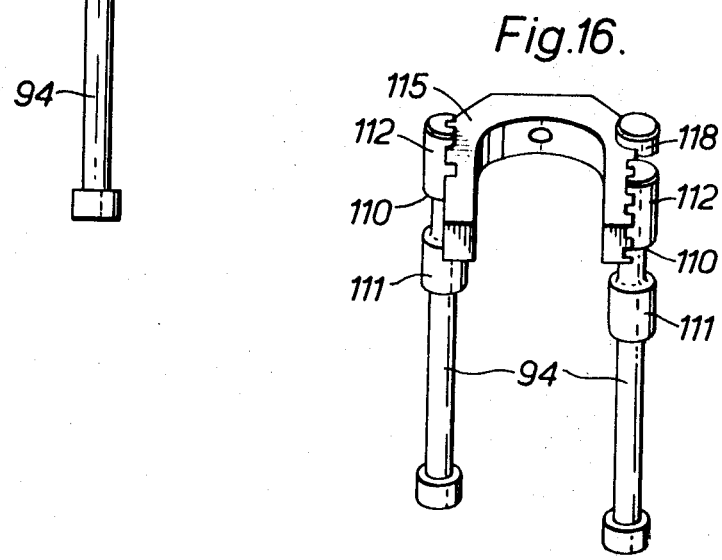
FIG. 16 is a fragmentary perspective view on arrow XVI of FIG. 15.
Figure 17:
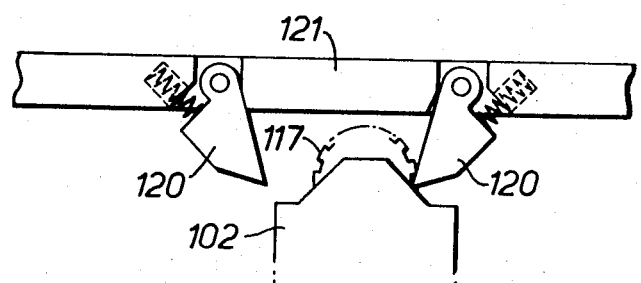
FIG. 17 is a scrap view of a detail.

Such pressure is exerted, in the machine being described, by a slug mould or container (hereinafter referred to for convenience as a mould) indicated generally at 90 in FIGS. 11, 13 and 14 through the intermediary of a cut-off plate 84 (see FIGS. 1B, 9 and 10). This plate is of generally flat rectangular shape, and has a central part-spherical recess 85 in its top face of slightly greater radius that that of the hemispherical nipple 80. On the opposite or under face of the plate is a low concentric circular rib 86, the zone of the plate 84 between the nipple 80 and the base of the rib 86 being reduced in thickness and pierced at 87 coaxially with the nipple orifice 81. The plate is engageable by the slug mould 90 as the latter is moved into its mould-charging position, and as the mould is raised through the final increment of this travel, the plate 84 rises with it and in turn displaces the nipple 80 to unseat the conical valve head 78.

The cut-off plate 84 slides on four vertical guide studs 88 (FIGS. 1B, 2A, 2B) surrounded by helical compression springs 89, the studs being screwed into the bottom end of the lower accumulator body 43. The plate 84 is normally spaced somewhat below the nipple 80 when the valve 60 is closed so that, on completion of the injection of a metered charge of plasticised material by the plunger 70 into the slug mould 90 and the subsequent withdrawal of the slug mould, the plate 84 is moved down by the springs 89 beyond the seating travel of the valve stem 76. This causes material in the orifices 81 and 87 to be stretched and broken, thus avoiding a hardened tail of material at the commencement of the next injection cycle. The gap between the nipple 80 and the plate 84 when the valve head 78 is seated can be adjusted to suit any particular moulding material by means of stop pins, one of which is shown at 73 in FIG. 2B, passing through holes 73a in the plate 84. The temperature of the plate 84 may be controlled by means of a heat exchange fluid which is passed through ducts 74 in the thickness of the plate.

The slug which is formed in the slug mould 90 can be transferred to a product mould into which it is extruded by a conventional ram. Alternatively, the mould 90 could itself be replaced by a product mould or by a die for forming a parison for blow moulding.

FIGS. 11–17 illustrate the slug mould 90 and part of the mechanism for its displacement between the filling and discharge positions. The slug mould 90 comprises a chamber 91 of the required cross-sectional shape and dimensions within which is reciprocable a plunger 92 which is a close sliding fit in the chamber. The plunger 92, is displaceable between an upper or outer limit position in which the exposed end face 93a of its crown 93 lies flush with the open end of the slug mould chamber 91, and a lower or inner limit position which is defined by a stop 94. The stop can be adjustable to vary the capacity of the chamber 91 in order to accommodate a slug of the required volume having regard to the size of the finished product.

The slug mould plunger 92 is hollow, its central cavity 95 terminating at the underside of the crown 93. A coaxial tube is located within the central cavity 95, the external diameter of the tube 96 being less than the internal width or diameter of the cavity so as to leave an annular clearance volume around the tube. The upper or outer end 96a of the tube 96 does not touch the internal surface of the crown 93 of the plunger 92 to allow heat exchange liquid to flow freely out of the tube.

The lower end of the tube 96 communicates with a heat exchange liquid inlet pipe 97 and the lower end of the central cavity 95 communicates with a liquid outlet pipe 98.

Additional temperature control of the mould 90 is provided by an annular duct 99 formed in the peripheral wall of the mould 90 near or just below the level of the maximum downward displacement of the plunger 92 for the circulation of heat exchange fluid at a controllable temperature. When the mould 90 is cold, this annular duct 99 may carry a hot fluid to raise the temperature of the wall of the chamber 91 to a value below the softening point of the material of the slug.

As the mould 90 heats up with successive fillings, it may then become necessary to extract heat from the mould by lowering the temperature of the heat exchange fluid in the duct 99.

The limit positions of axial displacement of the plunger 92 are determined by the stop 94, which determines the fully retracted limit, and a pair of lock nuts 101 which are adjustable on the threaded lower end 92a of the plunger. The lock nuts are adapted to abut the bottom face of a generally cup-shaped cradle 102 into which the mould 90 is inserted after the shrinking onto the bottom end of the mould 90 of a liner 103 which is a press fit into the cavity of the cup-shaped cradle and also serves to close the open circumference of the annular duct 99. The sleeve 103 has an in-turned flange 104 at its lower end which also serves as a distance piece or shim for the location of the open end face of the mould 90 relative to the nipple 80 of the delivery valve 60.

The limit of retraction of the plunger 92 is determined by the engagement of a pair of lateral arms 105 with the heads of the stop pins 94. The lateral arms 105 are integral with an adaptor 106 which serves to connect the flow and return pipes 97, 98 to the bore of the tube 96 and the annular clearance space around it, respectively.

This adaptor is screwed onto the lower end of the plunger 92. The stop pins 94 pass through bores in the arms 105.

The position of each stop pin 94 is determined by a respective dumb-bell head 110 (FIGS. 14–16), into the lower socket part 111 of which the stop pin is screwed. The upper head part 112 is semi-cylindrical, and its diametral face has grooves 113 at 45° to engage 45° teeth formed on the first outer surface of the corresponding limb of a fork 115 which is slidable on the top face of the slug mould cradle 102. The base or yoke of the fork 115 is drilled and tapped to receive a feed screw 116 on which is secured a toothed wheel 117. The feed screw 116 is captive in the cradle 102, so that rotation thereof moves the fork 115 in the direction of length of its limbs. Such displacement, however, results in a cam action between the inclined teeth 114 and the grooves 113 in the heads 112, so that the stop pins 94 move up or down, according to the direction of displacement of the fork 115 and the "hand" or direction of inclination of the teeth 114. The fork is restrained against lifting off the supporting surface of the cradle by retainer studs 118, shaped similarly to the dumb-bell heads 110 except that the diametral flat surface of the upper portion is plane and does not extend for the full height thereof, the top of the stud being full diameter to provide a segmental lip which overlies the top surface of the corresponding limb of the fork 115.

Adjustment of the fork 115 for controlling the setting of the stop pins 94 is effected by a pair of opposed pawls 120 (FIG. 17) pivoted on a common pawl bar 121. The pawls are spring loaded towards the toothed wheel 117 but are spaced apart far enough to ensure that both cannot engage the wheel 117 simultaneously. In fact, their spacing is such as to ensure that both can be free of the wheel. The pawl bar 121 is slidable in a guideway on a fixed part of the machine, such as the accumulator structure, in a position such that, as the mould 90 is swung into its filling or its unloading position, one or other of the pawls 120 can engage the toothed circumference and step the wheel round. In the mid position of the slide 121 no adjustment takes place.

The cradle 102 is suspended on trunnions 130 (FIG. 14) from the outer ends of a pair of arms 131 which are locked on a shaft 132 mounted in the bearings 133 on the machine frame and driven from the mould reciprocating mechanism as described below. The cradle 102 is steadied on its trunnions 130 by means of depending guide rods 135 anchored to the cradle structure on either side of the arms 131 with their lower ends slidable in bosses 136. These bosses are carried on stub shafts 137 in an extension 138 of the machine frame.

As the shaft 132 is rotated to swing the arms 131 downwards, the cradle is initially moved down substantially vertically. As the angle of deflection of the arms 131 increases, however, the trunnions 130 carry the cradle progressively further towards the vertical plane containing the axis of the shaft 132 so that the guide rods 135 deflect about the axes of the stub shafts 137.

Finally, when the arms 131 have moved to the vertical position, the axis of the slug mould 90 is horizontal and the slug can be ejected for subsequent handling as required.

The machine for which the foregoing mechanism was primarily designed is intended to mould articles in thermoelastic plastic materials by operating on them in their softening ranges. For this purpose, a slug is first formed and is transferred from the slug mould 90 to the final product mould into which it is forced by a ram. It will, however, be understood that the slug mould 90 can be replaced by a product mould having the required shape or configuration of the finished product so that the feed plunger 70 serves to ram the material from the accumulator 54 direct into the mould. The motions of the mould 90 described above then serve to allow the product to cool sufficiently before ejection in the horizontal attitude.

Whether the mould 90 is designed for manufacturing an intermediate slug or a final product, the action of the mould in first displacing the cut-off plate 84 and then the nipple 80 and valve stem 82 to open the delivery valve 60 remains the same.

By allowing the cut-off plate 84 a limited clearance from the nipple 80 when the delivery valve 60 is closed, clean separation of the mould 90 from the plasticiser head is ensured.

The design of the accumulator asembly 35, 36, 43 and plunger 70 ensures, both accurate feed and continuous flow of the material without the risk of the formation of pockets of "dead" material. Thus, material delivered by the screw feed plasticiser 14 passes through the conical adaptor 30 into the duct 48 and thence via the annular gallery 47 and ports 51 into the accumulator chamber 54 from all sides. From here, the material flows into the channels 61 formed in the wall of the outlet passage 57. If the plunger 70 is at the end of a feed stroke, and is in its limiting position of rotation for cutting off the ports 66, no material can pass beyond the blind lower ends 64 of the channels 61. The slug mould 90 is then lowered to release the nipple 80 and allow the conical valve head 78 to reseat under pressure of the material which is thus trapped in the flared chamber 58 between the valve head 78 and the lower end of the plunger 70.

Since, however, the screw 14 continues to rotate, pressure builds up in the accumulator chamber 54. This pressure forces the sleeve 53 to rise against its loading spring so as to maintain the pressure within the accumulator chamber substantially constant.

As soon as the plunger 70 is rotated to its other limit position shown in FIG. 1B in which the ports 66 register, at their upper ends, with the blind ends 64 of the channels 61, material flows from the channels into the feed or metering cavity 67 and thence into the flared chamber 58 and forces the plunger upwards. During this retraction stroke, which may be performed wholly by virtue of the pressure of the plastic material in the accumulator chamber 54 acting on the bottom end of the plunger 70, or may be positively assisted by mechanical means acting on the thrust bearing 72, the ports 66 remain in register with the channels 61. At the upper end of the retraction stroke of the plunger 70, the upper ends of the ports 66 lie just below the recess 52 of the chamber 54. The plunger is now rotated into its cut-off limit position ready for the next feed stroke.

The motion of the mould 90 is preferably so synchronised with the feed stroke of the plunger 70 as to ensure that the mould opens the delivery valve 60 at or immediately after the instant of cut-off of the ports 66. If, however, this degree of synchronisation is not achieved, the material is trapped between the valve head 78 and the ports 66 in the plunger and no flow can take place. The plasticiser screw 14, however, continues to deliver plastic material to the accumulator chamber 54, and the sleeve 53 rises against its loading springs 53a to increase the effective volume of the accumulator chamber 54.

As soon as the mould 90 opens the delivery valve 60 material trapped in the outlet passage 57 and conical valve chamber 79 passes through the inclined ports 83 into the bore 82 of the delivery valve stem and then through the orifices 81 in the nipple 80 and 87 in the cut-off plate 85 to fill the mould 90. The smooth conical formation of the valve head 78 and chamber 79 ensures that no "dead" material can dwell in the space below the valve 60, whilst the inclined ports 83 can be sufficiently numerous and of sufficient arcuate extent to minimise the risk of materials becoming trapped. There is no restriction on the freedom of the valve stem 77 to rotate, so that it is possible for the ports 83 to sweep at random through the complete 360° of arc below the valve head 78.

Similarly, by ensuring smooth contours in the ports 66 and feed cavity 67, the risk of the formation of pockets of dead material is minimised or eliminated so that at all times the passages open to plasticised material from the discharge end of the screw 14 to the mould 90 are continuously being scavenged by fresh incoming material. This both promotes complete uniformity of viscosity throughout the mass in the accumulator and efficiency of working of the material.

As will be understood, the quantity of material fed to the mould 90 on each feed stroke of the plunger 70 is variable within limits by the extent of the feed stroke after the point of cut-off of the ports 66 by the bottom of the cup-shaped recess 52 constituting the base of the accumulator chamber 54.

As has already been noted, fluctuations in pressure of the plasticised material in the accumulator chamber 54 are substantially avoided by the resilient loading of the sleeve 53 surrounding the shank 71 of the plunger 70. The sleeve may, of course, be replaced by a diaphragm or bellows. The extent to which the sleeve 53 is permitted to yield will depend upon the requirements of any particular machine or operation, and further be governed by the characteristics of the plasticised material itself. However, should the pressure in the accumulator chamber 54 rise unduly as a result of some failure of the mechanism, the load on the screw 14 increases, thus increasing the torque reaction on the gearbox 20, causing it to deflect and vary the gear ratio between the driving motor 23 and the screw 14. This will have the effect of slowing down the speed of rotation of the screw 14 so as to minimise the rate of pressure rise in the plasticsed material.

Depending upon the required cycle of operations, the mechanism for reciprocating the plunger 70 and effecting the necessary rotation can be any conventional form of cam or servo mechanism by which the several events of the machine are programmed. In this specification, however, it will be assumed that the moulding machine is designed for moulding articles from thermoelastic plastic materials in their softening ranges. In such a machine, the slug formed in the slug mould 90 is transferred—preferably by means of an intermediate transfer slide—to the entry to a product mould into which it is extruded by a ram. Both the product mould and the ram are reciprocated by a mechanism such as that described in our co-pending U.S. patent application No. 818,518, filed Apr. 23, 1969.

FIG. 18 is a somewhat formalised diagram of a typical sequence of events, and FIG. 19 is a schematic perspective layout of the mechanism for actuating the plunger 70 and the slug mould 90.

For the sake of completeness of description, FIGS. 18 and 19 illustrate events and components of the machine which are specific to the embodiments of the present invention in a machine of the above kind. These components include the fixed body 190 of the product mould; the separable mould closure or core component 191; the ejector 192; the transfer slide 195 and the ram 200. The ejector serves to push the slug from the slug mould 90 into the slug pocket 194 in the transfer slide 195 when the slug mould is in the position shown at 90a in FIG. 19 and the transfer slide is in its "up" position 195a.

The motion of the ejector 192 is derived from the product mould toggle 141, as indicated schematically by the connection 188. The motion of the transfer slide 195 is derived directly from the shaft 132 which controls the motion of the slug mould 90, and is illustrated in FIG. 19 as comprising a toggle linkage 196, 197, the knee joint 198 of which is directly linked to an arm 199 keyed or clamped on the slug mould oscillating shaft 132. In this way the motions of the transfer slide 195 are accurately synchronised with the oscillation of the slug mould 90 so that the slug pocket 194 is always available for reception of the moulded slug.

By virtue of the synchronising of the movements of the slug mould 90 with the separable core component 191 of the product mould, it follows that the movement of the transfer slide 195 is also synchronised with the core 191 and that, by appropriate design of the toggle 196, 197, the displacements of the transfer slide 195 can be accurately timed to ensure the presentation of the moulded slug in the pocket 194 to the advancing ram 200 at the point 7E in FIG. 18.

The mechanism is required not only to generate the axial and angular displacements of the plunger 70 in their correct sequences, but also time these accurately in relation to the motions of the slug mould 90, whose motions in turn must be accurately timed with respect to the displacements of the product mould and the ram. The mechanism is a linkage driven from the product mould closing mechanism and designed not only to impart the necessary displacements to the various controlled components but also to provide the required velocities or accelerations at the appropriate points in the working cycle of the machine.

Referring to FIG. 19, the separable closure or core component 191 of the product mould moves in a rectilinear path defined by guides 140 under the control of a toggle linkage 141. One end 142 of this linkage is articulated to the mould component and the opposite end 143 is journalled on a fixed axis 144. To the knee joint 145 of the toggle 141 is pinned a driving rod 146 whose other end is coupled to an input lever 147 fixed on a rocking shaft 148 journalled on a fixed axis 149. The rocking shaft 148 is the main input drive for the individual mechanisms which control the linear and rotary displacements of the plunger 70 and the motion of the slug mould 90.

As shown by the curve of graph 1 in FIG. 18, the product mould is held tightly closed for approximately half a cycle of the machine. The cycle is shown, arbitrarily, as commencing at the point of closing 1A of the mould, on the ordinate marked 0° (360°). At about the same time, the slug mould 90 engages the nipple 80 in the delivery valve 60 and the valve head 78 is lifted rapidly, the motions of these two components being represented by the sections 2A–2B and 3A–3B on the curves 2 and 3, respectively, of FIG. 18.

It should be noted that the graphs or curves in FIG. 18 are intended to illustrate the relative timings and durations of events rather than speeds or accelerations of individual machine components.

The slug mould 90 is swung on its shaft 132 by a rigid arm 150 clamped on the shaft and pinned at its free end to a link 151 which is articulated at 152 to a further link 153, the links 151 and 153 forming a toggle which is approaching the made position when the mould 90 is fully closed on the nipple 80. To the knee joint 152 is coupled a link 154 whose other end is jointed to a driving arm 155 clamped on the rocking shaft 148.

A second rigid arm 160 is clamped to the rocking shaft 148 and provides the input drive for rotating the plunger 70 through a pair of links 161, 162, a lever 163, and a link 164 which is ball-jointed to an arm 165 clamped to the plunger 70. The junction 166 between the links 161 and 162 is supported on a swinging arm 167 whose length and mean angle is partly determined by the motion of the links and the angle between them. Thus, adjustments of the length of the arm 167 and of its mean position of angular deflection can be used to modify the rotational motion of the plunger 70 relative to the input motion at the arm 160.

The axial displacement of the plunger 70 is governed by a floating lever 170 whose input end 171 is under the control of a driving toggle 172, 173 whose knee joint 174 is coupled by a link 175 to a rigid arm 176 fixed on the cross shaft 148 and, optionally, integral with the driving arm 147. The floating lever 170 is adjustably coupled to a double balance lever 177, the common pivot 178 being adjustable lengthwise of both levers simultaneously.

Reciprocation of the plunger 70 is partly controlled by the floating lever 170 through a crosshead sleeve 180 guided in a fixed bushing 181 and coupled to the lever 170 at a fulcrum 169 by a link 182, and partly by the pressure of the plastic mass between it and the valve head 78.

The lever 170 is effectively part of a compound lever system of which the other parts are the two equal and parallel levers which constitute the double balance lever 177. The double lever 177 is fulcrumed at one end about a fixed axis 179 substantially in the same vertical plane as the mean position of the input end 171 of the floating lever 170, while the upward deflection of the double lever 177 is resisted by a fluid pressure capsule 183 articulated through a stirrup 184 to the double lever 177 at points 185 which lie, lengthwise of the lever, between the axis of the plunger 70 and the adjustable common pivot 178. This mechanism operates as follows:

The input end 171 of the floating lever 170 is swung up and down about the pivot axis 178 in timed relationship with the product mould slide 142. A downward force applied at the point 171 to load the plunger 70 results in an upward force at the pivot 178 which in turn tends to raise the double lever 177 about its fulcrum 179. This upward displacement of the pivot 178 is, however, resisted by the fluid pressure in the capsule 183 through the stirrup 184 and actuating rod 186. If the plunger 70 is held against axial displacement, such upward displacement compresses the fluid in the capsule 183.

While the product mould remains closed (1A–1C in FIG. 18), its toggle 141 is straight or "made" (shown in FIG. 19 in a maximum over-centre locking attitude) and the knee joint 174 of the toggle 172, 173 is broken, and the input end 171 of the floating lever 170 is at its lowest position.

When the product mould toggle 141 begins to retract the mould slide 142, at the end of the product cooling time (176° crankshaft angle in FIG. 18) it "breaks" at its knee joint 145 and the links 161 and 175 are pushed to the left. At this instant in time, the plunger 70 is at the end of its feed stroke, the double balance lever 177 is resting on its stop 187, and crosshead sleeve 180 is in its lowest position. Displacement of the link 175 to the left "makes" the toggle 172, 173, thus raising the input end 171 of the floating lever 170. The pressure capsule 183 is at the limit of its discharge or feed stroke to bias the double balance lever 177 against its stop 187 so that the adjustable pivot 178 is effectively fixed. Hence raising of the input end 171 of the floating lever 170 raises the fulcrum 169 which in turn raises the crosshead sleeve 180.

Simultaneously, the link 161 is displaced to rotate the plunger 70. The ports 66 begin to register with the channels 61 in the accumulator outlet passage 57 approximately at the moment when the toggle 172, 173 reaches its "made" position. Until the ports 66 open, however, there is no end thrust on the plunger 70 to cause it to rise following the raising of the crosshead sleeve 180. As soon as the ports 66 open, the pressure of the plastic material in the accumulator is applied to the feed cavity below the plunger, and the latter is forced up until its top thrust bearing 72 re-seats on the internal shoulder 168 (FIG. 1b) in the crosshead sleeve 180. This retraction or reloading stroke of the plunger 70 takes place over a period represented by the section 5B–5C in FIG. 18, the duration of which is dependent on the pressure and viscosity of the plastic material in the accumulator 54, the only criterion being that the point 5C must be earlier in time than the point 4D which represents the instant of reclosing of the ports 66. The angles between the link 161 and the swinging arm 167, and between the latter and the link 162, are chosen to impart quick initial rotation of the plunger 70 to open the ports 66. An excess of the angular pitch of the mouths of the ports 66 over that of the channels 61 allows a certain amount of angular "overshoot" of the plunger 70 without obturation of the ports. During this period of overshoot, both the toggle represented by the arm 160 and the link 161 and the toggle 172, 173 are driven over-centre. At the same time the toggle 175, 176 also goes over-centre, the combination of these two over-centre travels ensuring that the input end 171 of the floating lever 170 makes no significant movement so that the crosshead sleeve 180 is held stationary.

When the product mould is fully open at 1D on the curve 1 of FIG. 18, the rocking shaft 148 is at one limit position of its oscillation. The plunger 70 is then at the corresponding limit of its rotation with its ports 66 open to the channels 61 in the accumulator outlet passage 57. The plasticising screw 14 continues to deliver plastic material to the accumulator chamber 54 to maintain the pressure below the plunger 70, the spring 53a loading the sleeve 53 allowing the latter to be forced upwards to accommodate any excess delivery. The point 5C on the plunger axial stroke curve 5 in FIG. 18 represents the condition when the thrust bearing 72 on the plunger 70 re-seats on the shoulder 168 in the crosshead sleeve 180. The ports 66 are still open, and therefore the plunger 70 exerts an upward thrust on the floating lever 170 tending to turn it clockwise about its input end 171. Such a movement of this lever, however, is resisted by the force of the pressure capsule 183 acting through the double balance lever 177 to hold the adjustable pivot 178 against upward displacement.

During the retraction stroke 5B–5C of the plunger 70, the slug mould 90 has been swung down into the position shown at 90a in FIG. 19 to register with the slug pocket 194 in the transfer slide 195 now in its "up" position 195a) at the point 2D and remains there until the point 2E to permit transfer of the slug from the mould 90 to the transfer slide pocket 194. At the point 2E, the transfer must have been completed to allow the transfer slide 195 to move from its "up" or loading position 6A on the curve 6 of FIG. 18 to its "down" or register position 6B, where it holds the slug aligned with the product mould entry before the ram reaches the slide at the point 6C. The terms "up" and "down" are used merely for descriptive convenience, since the direction of travel of the slide will be determined by considerations of mechanical design at this part of the machine. Furthermore, the mechanism for removing a slug from the slug mould 90 to its position of registration with the mould entry can be any convenient alternative to a slide.

The exact timing of the start 2C of the slug mould retraction stroke is relatively unimportant so long as this stroke is completed at 2D sufficiently before the ram 200 begins its advancing stroke at 7D (FIG. 18) to enable the slug to be ejected into the transfer slide 195 for transfer into register with the mouth of the pre-injection cavity of the fixed product mould 190 before the ram 200 reaches the transfer slide 195 at 7E in FIG. 18.

When the product mould beings to close (point 1D in FIG. 18), the plunger 70 may still be completing its retraction stroke on the curve 5B–5C. This is made possible by the arrangement of the toggles 160, 161 and 176, 175 which are designed to be driven over-centre at the point 1D. Consequently, reversal of the rotation of the rocking shaft 148 initially has no effect on the motions of the ports 66 and the crosshead sleeve 180. Furthermore, as has already been noted, the angle subtended by the ports 66 is greater than that subtended by the registering channels 61, so that initial breaking of the toggle 160, 161 at the start of the product mould closure does not begin to obturate the ports 66 until the point 4C. During this extended period of opening of the ports 66, the toggle 176, 175 first begins to break, but the toggle 172, 173 driven by it is in the over-centre position so that the input end 171 of the floating lever 170 does not begin to move until at least the instant of time represented by the point 4D of final closure of the ports.

At the point 4D, the plunger 70 is locked in its fully retracted position ready for the next feed stroke. Hence the point 169 can act as a fixed fulcrum for the floating lever 170 so that, as the continued movement of the product mould slide toggle 141 towards its made position causes the toggle 172, 173 to continue its breaking movement, the latter in turn displaces the input end 171 downwards. Thus the floating lever 170 is pivoted in the clockwise sense to raise the common pivot 178. This causes the double balance lever 177 to compress the capsule 183 and to preload the still immobile plunger 70. This compression action continues until the toggle 141 finally closes the product mould 190 at the point 1A in FIG. 18. Meanwhile, the plunger 70 cannot move on its feed stroke until the slug mould 90 opens the valve 78, so that a precharge pressure is developed in the mass of plastic material trapped between the plunger and the valve before the latter is opened.

As soon as the valve head 78 is unseated, the pressure below the plunger 70 is relieved. The force exerted by the capsule 183 on the stirrup 184 is tending to swing the double balance lever 177 down about its pivot axis 179 so as to depress the common pivot 178, and the toggle 172, 173 is lowering the input end 171 of the floating lever 170 to the limit of its preload condition, which is reached at the instant 1A of return of the product mould toggle 141 to the made position illustrated in FIG. 19. Consequently, the plunger 70 descends on its feed stroke under the action of the capsule 183, the pressure in which determines the rate of feed of plastic material to the slug mould 90. A resilient bump stop 187 is engageable by the free end of the double balance lever 177.

Since the motions of the various components of the machine are timed in relation to displacements of the separable component 191 of the product mould, the provision of the compound lever system 170, 177 and the fluid pressure capsule 183 enables the pressure energy stored in the latter during the period 5D–5A immediately following the closure of the ports 66 in the retracted plunger to be returned to the system during the maximum slug mould filling time 2B–2C. During this time, there is no input motion to the rocking shaft 148, which serves as the common source of motion of the plunger and the slug mould, and hence there would normally be no displacement of any of the components, including the plunger 70. Thus, the floating lever system 170, 177 and pressure fluid capsule 183 enables the filling of the slug mould to continue during an otherwise "dead" period in readiness for the next opening of the product mould 190.

For the sake of completeness, FIG. 18 shows a curve 7 for the ram events and their timings. As before, the curve 7 does not attempt to delineate speeds or accelerations, the only important phase of the ram action being section 7A–7B when the ram 200 is stationary in the product mould for a minimum period during which the base of the product freezes. Thereafter the ram retracts and is held retracted from 7C–7D, which period is made as long as possible in order to allow other events to take place without interference from the ram. From the point 7D back to 7A, the ram 200 is advancing, and at the point 7E it meets the transfer slide and transports the slug into the product mould. The latter is timed to be fully closed at 1A, which corresponds to the point 7F on the ram curve, whence it will be seen that the period 7F–7A is the maximum period available for extrusion of the slug into the product mould cavity.

What is claimed is:

1. An apparatus for feeding a charge of plasticised molding material to a receptacle comprising
   an accumulator having a chamber open to a continuous source of the plasticised molding material, a wall defining an outlet passage from said chamber having a discharge end in communication with said chamber, and a plurality of blind channels formed symmetrically around said wall and communicating at the inner ends thereof with said chamber and terminating short of the discharge end of the said outlet passage;
   a delivery valve disposed at said discharge end of said outlet passage for controlling the discharge of plasticised material from said discharge end;
   means for maintaining a substantially constant pressure on the plasticised material within said accumulator chamber;
   a feed plunger reciprocably and rotatably mounted in said outlet passage and having an axial cavity at a discharge end thereof and a plurality of ports communicating said cavity with said outlet passage, each said port being disposed to register with a respective blind channel;
   means for rotating said plunger to selectively displace said ports out of register with said blind channels; and
   means for reciprocating said plunger in said outlet passage whereby upon rotation of said plunger to register said ports and blind channels the plasticised material fills said outlet passage at said discharge end to retract said plunger, and upon subsequent rotation of said plunger to displace said ports from register with said blind channels, said means for reciprocating said plunger advances said plunger toward said discharge end to feed a charge of plasticised material outwardly thereof.

2. An apparatus as set forth in claim 1 wherein said blind channels occupy not more than half the circumferential surface of said wall.

3. An apparatus as set forth in claim 1 wherein said means for maintaining a substantially constant pressure includes a junction ring having an inlet duct, a gallery communicating with said duct and surrounding said chamber and a plurality of spaced radial ports communicating said gallery with said chamber.

4. An apparatus as set forth in claim 1 which further comprises a sleeve mounted in said accumulator above said chamber and slidably mounting said plunger therein, and spring means for biasing said sleeve toward said chamber against the delivery of casting material therein.

5. An apparatus as set forth in claim 1 wherein said accumulator includes a pair of accumulator bodies each having aligned bores forming said chamber, the bore of one of said bodies being larger than the bore of the other of said bodies and which further comprises a sleeve slidably mounted in said larger bore and slidably receiving said feed plunger therein whereby an accumulation of molding material in said chamber between said bodies urges said sleeve out of said larger bore.

6. An apparatus as set forth in claim 5 wherein said other bore includes a cup shaped recess facing said larger bore, said blindchannels terminating in said cup shaped recess.
bore, said blind channels terminating in said cup shaped recess.

7. An apparatus as set forth in claim 5 said accumulator further includes a junction ring securing said bodies to each other, said junction ring having a gallery surrounding said larger bore for delivering molding material thereto and said accumulator body defining said larger bore having a plurality of ports communicating said gallery with said larger bore.

8. An apparatus as set forth in claim 1 wherein said delivery valve has a valve head, a valve seat located on the discharge side of said head, and a valve stem passing outwardly through said valve seat, and wherein means is located at the outward end of said valve stem for urging said valve head inwards toward the accumulator chamber at each feed stroke of the feed plunger whereby a charge of molding material can be fed out of said accumulator.

9. An apparatus as set forth in claim 8 wherein said latter means includes a cut off plate facing said valve stem and spring means between said plate and valve stem urging said plate from said valve stem.

10. An apparatus for feeding a charge of plasticised molding material to a receptacle comprising an accumulator having a chamber open to a continuous source of the plasticised molding material, a wall defining an outlet passage having a discharge end in communication with said chamber, and at least one blind channel formed in said wall and opening at the inner end thereof into said chamber and terminating short of the discharge end of the said outlet passage;

means disposed at said discharge end of said outlet passage for controlling the discharge of plasticised material from said discharge end;

a feed plunger reciprocably and rotatably mounted in said outlet passage and having a port passing therethrough communicating the end of said plunger with said outlet passage, said port being disposed to register with a respective blind channel;

means for rotating said plunger to selectively displace said port out of register with said blind channel; and means for reciprocating said plunger in said outlet passage whereby upon rotation of said plunger to register said port and blind channel the continuously supplied plasticised material fills said outlet passage at said discharge end to retract said plunger, and upon subsequent rotation of said plunger to displace said port from register with said blind channel, said means for reciprocating said plunger advances said plunger toward said discharge end to feed a charge of plasticised material outwardly thereof.

11. An apparatus as set forth in claim 10 wherein said means at said discharge end includes a valve having a conduit therethrough and a valve stem sealingly disposed in said conduit, and means for moving said valve stem out of sealing engagement in said conduit for permitting the passage of molding material through said conduit out of said outlet passage.

12. An apparatus as set forth in claim 11 wherein said latter means includes an element which is spring biased away from said valve stem and displaceable by said receptacle against said spring bias whereby movement of said latter means against said valve stem permits discharge of the molding material and movement of said latter means under the spring bias permits sealing engagement of said valve stem in said conduit.

13. An apparatus as set forth in claim 10 which further comprises means for continuously supplying plasticised molding material to said chamber of said accumulator.

14. An apparatus as set forth in claim 10 wherein said feed plunger has an axial cavity in said end thereof in communication with said port.

References Cited

UNITED STATES PATENTS

| 3,132,775 | 5/1964 | Trumbull et al. | 222—309 X |
| 2,491,343 | 12/1949 | Valyi | 18—30 AA |

FOREIGN PATENTS

| 1,093,669 | 11/1954 | France | 18—30 AR |

J. SPENCER OVERHOLSER, Primary Examiner

D. S. SAFRAN, Assistant Examiner

U.S. Cl. X.R.

18—30 AM, 30 AH; 141—259

UNITED STATES PATENT OFFICE
CERTIFICATE OF CORRECTION

Patent No. 3,611,505　　　　　　　　Dated October 12, 1971

Inventor(s) Eugen Weber and Victor F. Zahner

It is certified that error appears in the above-identified patent and that said Letters Patent are hereby corrected as shown below:

Column 2, line 55, insert "filed April 23, 1969" after --No. 818,518--

Column 7, line 8, "first" should be --flat--

Column 12, line 51, "beings" should be --begin--

Column 14, lines 51 and 52 have been repeated.

Signed and sealed this 28th day of March 1972.

(SEAL)
Attest:

EDWARD M. FLETCHER, JR.　　　　　ROBERT GOTTSCHALK
Attesting Officer　　　　　　　　Commissioner of Patents

UNITED STATES PATENT OFFICE
CERTIFICATE OF CORRECTION

Patent No. 3,611,505　　　　　　　　　Dated October 12, 1971

Inventor(s) Eugen Weber et al.

It is certified that error appears in the above-identified patent and that said Letters Patent are hereby corrected as shown below:

Column 3, between lines 60 and 61, insert -- heat to the plastic material for producing in it the necessary --.
Column 12, line 28, before "now" insert -- ( --.

Signed and sealed this 8th day of August 1972.

(SEAL)
Attest:

EDWARD M. FLETCHER, JR.
Attesting Officer

ROBERT GOTTSCHALK
Commissioner of Patents